Nov. 22, 1955     C. G. SONTHEIMER     2,724,273
LIQUID WEIGHT GAUGING APPARATUS
Original Filed Jan. 31, 1950
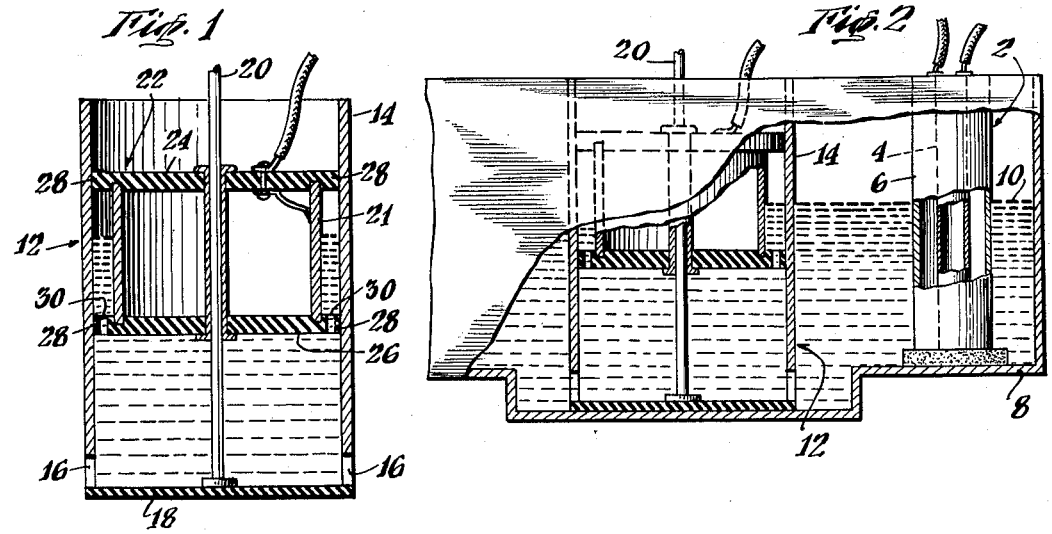
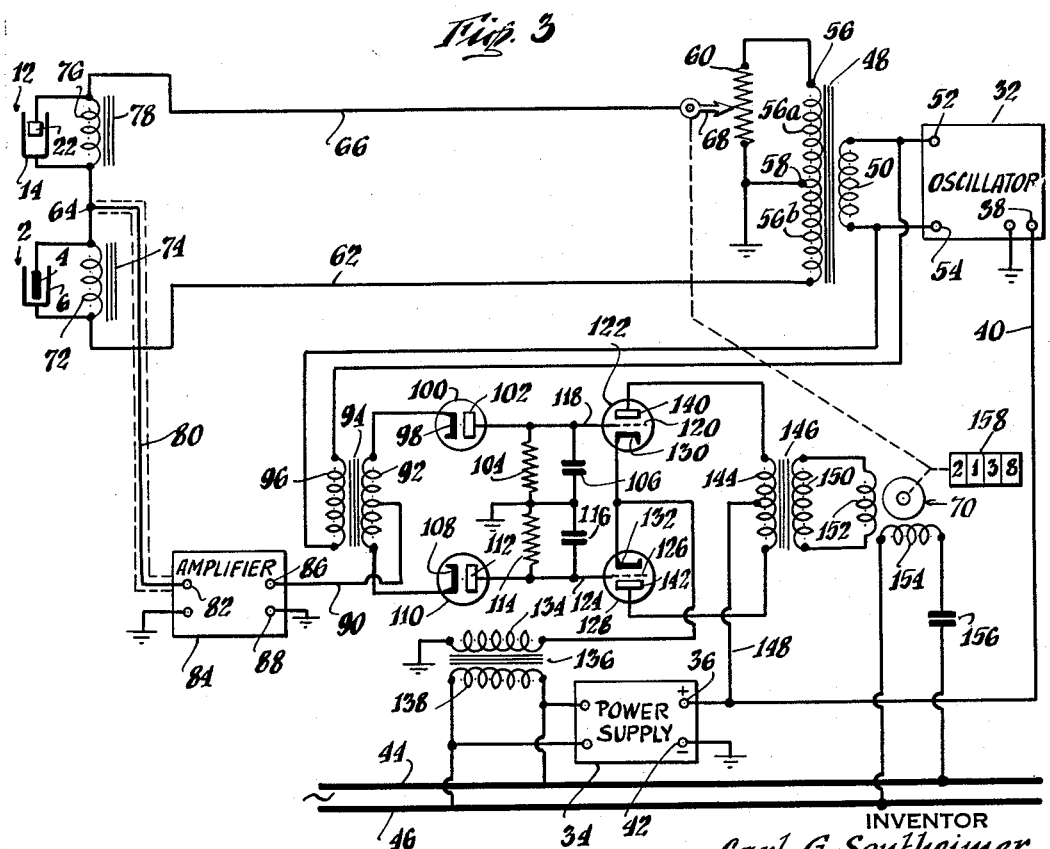
INVENTOR
*Carl G. Sontheimer*
BY
*Robert S. Dunham*
ATTORNEY

United States Patent Office 2,724,273
Patented Nov. 22, 1955

2,724,273

LIQUID WEIGHT GAUGING APPARATUS

Carl G. Sontheimer, Riverside, Conn., assignor to The Liquidometer Corporation, Long Island City, N. Y., a corporation of Delaware Division of application Serial No. 141,452, January 31, 1950, which was abandoned and replaced by a continuation application Serial No. 465,038, October 27, 1954. This application November 14, 1952, Serial No. 320,585

16 Claims. (Cl. 73—304)

This invention relates to a combined hydrometric and capacitive device responsive to the dielectric constant and specific gravity of a liquid and also to a system for measuring the weight of a liquid in a container embodying such a capacitive device. A system of this type is disclosed in copending United States application, Serial No. 141,452, filed January 31, 1950, of which this application is a division this application now being abandoned and being replaced by a continuation application Serial No. 465,038, filed October 27, 1954.

In accordance with the invention there is provided a combined hydrometric and capacitive device, comprising a float having a predetermined bulk density which is arranged to float at various different levels in respect to the surface of different liquids having a predetermined range of different specific gravities to be measured, at least a portion of a vertically disposed surface of said float being of electrically conductive material to form one electrode of a condenser, the dielectric of which is composed in part of the liquid in which said float is partially immersed and the balance a gaseous medium above the surface of said liquid, said float being adapted for use as a part of a capacitor in conjunction with a vertically disposed stationary conductive surface of an electrode extending into the liquid.

The invention also provides a system for measuring the weight of liquid in a container wherein capacitance change produced by the presence of said liquid is measured and used to control an indicator, while eliminating errors caused by variations in the dielectric constant of the liquid and introducing a density factor to convert volume measurements to weight measurements, said system comprising a source of alternating voltage, a measuring condenser, the reactance of which is a function of the level and dielectric constant of said liquid, a first inductance connected to said measuring condenser and having a reactance at the frequency of said alternating voltage equal to the magnitude of the reactance of said measuring condenser when free of said liquid, a compensating condenser in accordance with the present invention, a second inductance connected to said compensating condenser and having a reactance at the frequency of said alternating voltage equal to the magnitude of the reactance which said compensating condenser would have if the dielectric constant of said liquid were unity, circuit means connecting said measuring and compensating condensers and said voltage source, and voltage-responsive means coupled to said circuit means for indicating a quantity which is a function of the weight of said liquid.

The invention will be described with reference to the accompanying drawings in which:

Figure 1 illustrates, diagrammatically, a vertical cross-section of the hydrometric and capacitive device of the invention;

Figure 2 is a diagrammatic view showing a portion of a fuel tank with a measuring condenser and the combined hydrometric and capacitive device of the invention positioned therein;

Figure 3 is a circuit diagram of the measuring system of the invention.

As shown in Figure 2, a measuring condenser, generally indicated at 2, having plates formed by an inner metal cylinder 4 and an outer metal cylinder 6 which surrounds and is spaced from the inner cylinder 4, is positioned vertically in a liquid-containing tank 8, which is assumed to be of uniform cross-sectional area. The cylinders 4 and 6 have uniform cross-sectional dimensions and are supported mechanically in any suitable way and, in this particular embodiment, are insulated from ground. Suitable openings (not shown) are provided in the outer cylinder 6 so that the liquid 10, the quantity of which is to be measured will rise to a level between the two cylinders corresponding to the level of the liquid in the tank. The electrical capacity of the measuring condenser 2 is then a function of the amount (volume) of liquid in the tank and the dielectric constant of the liquid.

A combined hydrometric and capacitive device in accordance with the invention, generally indicated at 12, is also positioned in the tank 8. This device 12, as more clearly shown in Figure 1, comprises an outer metal cylinder 14 which extends vertically from the bottom to the top of the tank 8. This outer cylinder forms one plate of the capacitive element and is provided with suitable openings, as at 16, to allow the liquid to enter inside of the cylinder 14. The bottom of the cylinder 14 is advantageously closed by a circular disc 18 of insulating material. A centrally positioned rod 20 of insulating material is secured to and extends upwardly from the disc 18.

The other plate of this condenser is formed by a cylindrical wall 21 of a float, generally indicated at 22, positioned symmetrically within the outer plate 14. The float 22 is provided with a vertical opening through which the guide rod 20 extends so that the float 22 is free to move upwardly and downwardly on the rod 20. The upper and lower ends of the float 22 are sealed by annular discs 24 and 26 of insulating material, which advantageously have overhanging edges as at 28, which maintain the position of the metal portion of the float concentric with the outer cylinder 14. The lower annular disc 26 of insulating material is advantageously provided with suitable openings 30 near its outer edge so that the liquid being measured can enter the space between the inner and outer condenser plates formed by the cylindrical wall 21 and the cylinder 14.

The depth to which the float 22 sinks in the liquid depends upon the density of the liquid; the capacity of the condenser formed by the concentric cylindrical plates of this condenser depends upon the depth to which the float is submerged and the dielectric constant of the liquid between the plates. This single structure accordingly may be utilized to compensate both for density and dielectric constant. It is apparent that the total length of the device 12 advantageously is enough greater than the actual depth of the tank to allow the float 22 to seek its proper level in the liquid irrespective of the amount of liquid in the tank. Thus, the device 12 may be located in a well portion of the tank 8 as shown in Fig. 2.

The arrangement of the measuring condenser 2 and the combined hydrometric and capacitive device 12 in a bridge-type measuring system is shown in Figure 3. This bridge circuit is energized by an oscillator, indicated in block form at 32, which may be of any conventional type, but which should be stable in operation so that the frequency of its signal will remain constant. The signal produced by the oscillator 32 is preferably in the audio-frequency range, but may be higher if desired; a frequency of 10,000 cycles per second is suitable. The oscillator 32 may be energized from a conventional rectifier-filter power supply, indicated in block form at 34, the positive terminal 36 of which is connected to terminal 38 of the oscillator 32 by a lead 40, the supply circuit being completed from the negative terminal 42 of power supply 34 through the common ground circuit. The power supply 34 is in turn connected to power mains 44 and 46, supplying, for example, 400-cycle alternating current.

The signal from the oscillator 32 is coupled to the bridge circuit through a transformer 48, the primary winding 50 of which is connected across the output terminals 52 and 54 of the oscillator 32. The secondary winding 56 is divided into two equal portions 56a and 56b by a center-tap 58 which is connected to the common ground circuit. One end of the secondary winding 56 is connected to a potentiometer, generally indicated at 60. The other end of the secondary winding 56 is connected by a lead 62 to the outer plate 6 of the measuring condenser 2, the inner plate 4 of which is connected to a bridge output terminal 64.

The bridge output terminal 64 is connected also to the plate or cylinder 14 of the combined hydrometric and capacitive device 12, the conductive cylindrical wall 21 of the float 22 of which is connected by a lead 66 to a sliding contact 68 of the potentiometer 60, which is in turn connected across the portion 56a of the transformer secondary winding 56. The potentiometer is provided for rebalancing the bridge circuit and can be operated manually; or the system can be rebalanced automatically by means of a motor, generally indicated at 70, which controls the setting of the sliding contact 68.

An inductance 72, having a low loss core 74, which may be formed from powdered iron, is connected in parallel with the measuring condenser 2; and an inductance 76, preferably having a similar core 78, is connected in parallel with the combined hydrometric and capacitive device 12. These inductances and the combined hydrometric and capacitive device 12 are provided for the purpose of compensating for changes in the dielectric constant of the liquid 10, the weight of which is to be measured.

If the impedance of the parallel combination of the measuring condenser 2 and the inductance 72 is equal to the impedance of the parallel combination of the combined hydrometric and capacitive device 12 and the inductance 76; and if the voltages delivered to this portion of the bridge circuit by the leads 62 and 66 are balanced with respect to ground, no unbalance voltage will appear between output terminal 64 and ground. If the impedance of one of these condenser-inductance combinations is greater than the other, an unbalance voltage is developed which is either in-phase, or 180° out-of-phase, with respect to the voltage delivered by the oscillator 32, depending upon which of the two bridge arms has the higher impedance. The bridge circuit can be rebalanced by varying the voltage applied to the bridge circuit by one of the portions 56a or 56b of transformer winding 56. This is accomplished, as pointed out above, by adjustment of the sliding contact 68 of the potentiometer 60, the position of the contact 68, when the bridge is balanced, corresponding to the relative impedances of the two bridge arms including the measuring condenser 2 and the combined hydrometric and capacitive device 12 respectively.

The impedance of the transformer winding 56, and the resistance of potentiometer 60 are preferably so low as compared with the impedances of the measuring condenser 2 and the device 12, that they can be neglected in calculating the circuit parameters.

This bridge circuit may be rebalanced automatically by the following circuit arrangement. The unbalance voltage appearing at the bridge output terminal 64 is coupled by means of a shielded lead 80 to an input terminal 82 of a conventional vacuum tube amplifier, shown in block form at 84.

The amplified voltage appears between two output terminals 86 and 88 of the amplifier 84, the terminal 88 being connected to ground and the terminal 86, by a lead 90, to the center tap of a secondary winding 92 of a transformer 94.

The primary winding 96 of this transformer is connected across the output terminals 52 and 54 of the oscillator 32. The signal induced in the secondary winding 92 of the transformer 94 from the primary winding 96, and the unbalance signal delivered to it from the amplifier 84 will add in one-half of the secondary winding 92, but will oppose each other in the opposite half of this winding. Thus, when the bridge is unbalanced, the voltage at one end of transformer winding 92, with respect to ground, will be relatively higher and the voltage at the opposite end of the winding, with respect to ground, will be relatively lower. The end of the winding 92 having the higher voltage will depend upon the phase relationship of the two voltages. When the bridge is balanced, no voltage will be delivered by the amplifier 84 to the transformer winding 92 and, accordingly, the voltages between each end of the transformer winding 92 and ground will be equal.

The voltages delivered by winding 92 are coupled to conventional rectifier-filter arrangements. One end of the transformer winding 92 is connected to a cathode 98 of a diode rectifier tube 100, the anode 102 of which is connected to ground through a load resistor 104, a suitable filter condenser 106 being connected in parallel with the load resistor 104.

The opposite end of transformer winding 92 is connected to a cathode 108 of a diode rectifier tube 110, the anode 112 of which is connected to ground through a load resistor 114, which is identical in value with the load resistor 104 of tube 100. A filter condenser 116 is connected in parallel with the load resistor 114.

A negative D.-C. voltage is produced at each of the anodes 102 and 112 in accordance with the magnitude of the alternating voltages delivered to their respective cathodes from the transformer winding 92. The direct voltage appearing at the anode 102 of the tube 100 is coupled by a lead 118 to a control grid 120 of a vacuum tube 122 which is shown as a triode by way of example, but which may be a tetrode or pentode connected in conventional manner. The direct voltage appearing at the anode 112 of the tube 110 is connected by a lead 124 to a control grid 126 of a vacuum tube 128, which is identical with tube 122.

The cathodes 130 and 132 of tubes 122 and 128, respectively, are connected together and to ground through a secondary winding 134 of a transformer 136, the primary 138 of which is connected to the 400-cycle alternating current power mains 44 and 46.

The anodes 140 and 142 of the tubes 122 and 128, respectively, are connected to opposite ends of a primary winding 144 of an output transformer 146, the midpoint of which is connected by a lead 148 to the positive terminal 36 of the power supply 34.

If the negative control voltages applied to the grids 120 and 126 of the tubes 122 and 128 are equal, so that the conductivities of the two tubes are equal, the 400-cycle signal, which is induced in the cathode circuits by the transformer 136, will be cancelled in the anode circuits, and no voltage will be induced in the secondary winding 150 of the transformer 146. However, if the bridge is unbalanced, for example, in such a direction that a higher negative voltage is delivered by the diode 110 than by the diode 100, the tube 122 will have a higher conductivity and the 400-cycle signal will not be cancelled in the anode circuits of the tubes 122 and 128. An alternating voltage will then be induced in the transformer secondary winding 150. If the bridge is unbalanced in the opposite direction, so that tube 128 has the greater conductivity, the 400-cycle signal appearing in the secondary winding 150, will be of opposite phase. Thus, with the bridge circuit balanced, no voltage will appear in the secondary winding 150 of transformer 146; if the bridge is unbalanced in one direction a 400-cycle signal is produced of one phase; and if it is unbalanced in the opposite direction, a 400-cycle signal of opposite phase is induced in this winding.

The transformer winding 150 is connected to a winding 152 of the two-phase reversible motor 70. The other winding 154 of this motor is connected through a phase shifting condenser 156 to the 400-cycle mains 44 and 46. If no voltage is applied to the winding 152 of the motor 70, the motor remains stationary; if the voltage applied to this winding is in phase with the voltage delivered by the alternating current mains, the motor will rotate in one direction; and if the voltage applied to this winding is of opposite phase, the motor will rotate in the opposite direction. The direction of rotation of the motor 70, thus, depends upon the direction of unbalance of the bridge circuit.

This motor 70 is mechanically connected through a suitable coupling and gear reduction arrangement (shown diagrammatically as a broken line) to the sliding contact 68 of the potentiometer 60 and the phase relationships in the circuit are adjusted, in known manner, so that the motor 70 will rotate in such direction as to rebalance the bridge.

The motor 70 is mechanically connected also to a countertype indicator 158 which denotes the amount of liquid in the tank 8.

In order to explain the operation of the system, the measuring condenser 2 may be considered to have a capacity of $C_0$ when the tank is empty and the space between the inner and outer cylinders is filled with air. As in the above example, the horizontal cross-sectional area of the liquid-containing tank is assumed to be constant and the measuring condenser of uniform horizontal dimensions throughout its length. Assume also that the dielectric constant of the liquid 10 is K, the height of the tank is H, and the depth of the liquid in the tank is L, then the proportion (X) of the measuring condenser 2 that is immersed in the liquid is $$X = \frac{L}{H} \tag{1}$$

and the capacity ($C_M$) of the measuring condenser is $$C_M = C_0 + XKC_0 - XC_0 \tag{2}$$

or $$C_M = C_0[1 + X(K-1)] \tag{3}$$

Let "W" equal the weight of the float 22, "H" equal the height of the float 22, "A" equal its cross-sectional area, "d" equal the density of the liquid which is to be measured, and "Y" equal the fractional proportion of the total height of the float 22 that is submerged in the liquid.

The capacity of the hydrometric and capacitive device 12 from Equation 3 is $$C_c = \delta C_0 [1 + Y(K-1)] \tag{4}$$

in which $\delta$ is a factor representing the ratio of the capacitance of the compensating condenser shown at 12 (Fig. 3) to the capacitance of the measuring condenser 2 on the basis of the dielectric in each condenser having a value of unity.

The proportion of the total height of the float submerged may be expressed as follows:

$$Y = \frac{W}{HAd} \tag{5}$$

which, by substituting a constant $$\beta = \frac{W}{HA} \tag{6}$$

becomes $$Y = \frac{\beta}{d} \tag{7}$$

Inserting this value in Equation 4 gives the following value for the total capacitance of the hydrometric and capacitive device 12.

$$C_c = \delta C_0 \left[ 1 + \frac{\beta}{d}(K-1) \right] \tag{8}$$

The inductance 76, which is in parallel with the device 12, is selected of such value that it forms a parallel resonant circuit at the operating frequency with the device 12, provided the device 12 contained no liquid, that is, if all of the space between its plates were filled with air. If the applied frequency is equal to $$\frac{\omega}{2\pi}$$

the value of this inductance 76 is $$L_{76} = \frac{1}{\omega^2 \delta C_0} \tag{9}$$

The impedance of this parallel combination of inductance 76 and the hydrometric and capacitive device 12 then is $$Z_1 = \frac{1}{j\omega\left[\delta C_0 + \frac{\beta}{d}\delta C_0(K-1)\right] - j\omega\delta C_0}$$

$$= \frac{1}{j\omega\delta C_0\left[\frac{\beta}{d}(K-1)\right]} \tag{10}$$

Assume that the oscillator 32 delivers a signal of frequency $$\frac{\omega}{2\pi}$$

The inductance 72, in parallel with the measuring condenser 2, is of such value that the combination is resonant at this frequency when the tank is empty; the value of the inductance then is $$L_{72} = \frac{1}{\omega^2 \delta C_0} \tag{11}$$

The impedance of this parallel combination is $$Z_2 = \frac{1}{j\omega C_0(K-1)X} \tag{12}$$

The ratio of the output voltage $e_0$ between output terminal 64 and ground to the voltage $e$ delivered by each half of the transformer winding 56 is equal to $$\frac{e_0}{e} = \frac{Z_1}{Z_1 + Z_2} - \frac{mZ_2}{Z_1 + Z_2} \tag{13}$$

where the factor $m$ depends on the setting of the potentiometer contact 68. Substituting the values of $Z_1$ and $Z_2$ from Equations 10 and 12, this becomes $$\frac{e_0}{e} = \frac{\dfrac{1}{j\omega\delta C_0\left[\dfrac{\beta}{d}(K-1)\right]}}{\dfrac{1}{j\omega\delta C_0\left[\dfrac{\beta}{d}(K-1)\right]} + \dfrac{1}{j\omega C_0 X(K-1)}} - \frac{\dfrac{m}{j\omega C_0 X(K-1)}}{\dfrac{1}{j\omega\delta C_0\left[\dfrac{\beta}{d}(K-1)\right]} + \dfrac{1}{j\omega C_0 X(K-1)}} \tag{14}$$

Thus $$\frac{e_0}{e} = \frac{dX - m\delta\beta}{dX + \delta\beta} \tag{15}$$

and at balance condition when the output voltage $e_0$ is zero $$m = \frac{dX}{\delta\beta} \tag{16}$$

Thus, the position of the potentiometer contact 68 under balance conditions is a direct function of the product of the density $d$ of the liquid and the height X of the liquid in the measuring condenser, and is independent of the dielectric constant of the liquid so that the position of the sliding contact 68 of the rebalancing potentiometer 60 can be calibrated directly in terms of the weight of the liquid in the tank.

I claim:

1. A combined hydrometric and capacitive device, comprising a float having a predetermined bulk density which is arranged to float at various different levels in respect to the surface of different liquids having a predetermined range of different specific gravities to be measured, at least a portion of a vertically disposed surface of said float being of electrically conductive material to form one electrode of a condenser, the dielectric of which is composed in part of the liquid in which said float is partially immersed and the balance a gaseous medium above the surface of said liquid, said electrode of electrically conductive material being adapted to be immersed in the liquid to an extent dependent upon the density of the liquid, said float being adapted for use as one plate of a capacitor in conjunction with another plate constituted by a vertically disposed stationary conductive surface of an electrode extending into the liquid.

2. A combined hydrometric and capacitive device, comprising a float having a predetermined bulk density which is arranged to float at various different levels in respect to the surface of different liquids having a predetermined range of different specific gravities to be measured, at least a portion of a vertically disposed surface of said float being of electrically conductive material to form one plate of a condenser, the dielectric of which is composed in part of the liquid in which said float is partially immersed and the balance a gaseous medium above the surface of said liquid, a vertically disposed stationary electrode extending into said liquid and constituting the other plate of said condenser, said plate of electrically conductive material being adapted to be immersed in the liquid to an extent dependent upon the density of the liquid, and means guiding said float for solely vertical movement in respect to said stationary electrode, whereby the capacitance of said device is a joint function of the dielectric constant of said liquid and the specific gravity thereof.

3. A combined hydrometric and capacitive device according to claim 1, in which the electrically conductive material, which forms one electrode of the condenser and which is carried by said float, is substantially cylindrical, and is arranged with its axis vertical in the operative position of the float.

4. A combined hydrometric and capacitive device according to claim 2, in which said vertically disposed stationary electrode is formed as a vertical cylindrical member arranged substantially concentrically to enclose the vertical path of the movement of said float with changes in the level of the liquid.

5. A combined hydrometric and capacitive device according to claim 1, in which the float is made up of a cylindrical conductive side wall arranged with its axis vertical in the operative position of the float and constituting said one electrode of the condenser, said float being further constituted by non-conductive top and bottom closures for said side wall.

6. A system for measuring the weight of liquid in a container, wherein capacitance change produced by the presence of said liquid is measured and used to control an indicator, while eliminating errors caused by variations in the dielectric constant of the liquid and introducing a density factor to convert volume measurements to weight measurements, said system comprising a source of alternating voltage, a measuring condenser immersed in the liquid in said container to an extent dependent upon the level thereof, the reactance of said measuring condenser being a function of the level and of the dielectric constant of said liquid, a first inductance connected to said measuring condenser and having a reactance at the frequency of said alternating voltage equal to the magnitude of the reactance of said measuring condenser when free of said liquid, a combined hydrometric and capacitive device constituting a compensating condenser and including at least one condenser plate which is immersed in the liquid to an extent dependent upon the density thereof, so as to have a reactance which is a function both of the specific gravity and of the dielectric constant of the liquid and is independent of the level thereof in said container, a second inductance connected to said compensating condenser and having a reactance at the frequency of said alternating voltage equal to the magnitude of the reactance of said compensating condenser when free of said liquid and if the dielectric between its plates had a constant of unity, circuit means connecting said measuring and compensating condensers and said voltage source, and voltage-responsive means coupled to said circuit means for indicating a quantity which is a function of the weight of said liquid.

7. A system according to claim 6, in which said first inductance is connected in parallel with said measuring condenser, and in which said second inductance is connected in parallel with said compensating condenser.

8. A system according to claim 6, in which said first inductance and said measuring condenser connected therewith comprise a first network, and said second inductance and said compensating condenser connected therewith comprise a second network, said first and said second networks being connected as two arms respectively of a bridge circuit; and in which said voltage-responsive means comprise means connected and responsive to the output of said bridge circuit.

9. A system for measuring the weight of liquid in a container, wherein capacitance change produced by the presence of said liquid is measured and used to control an indicator, while eliminating errors caused by variations in the dielectric constant of the liquid and introducing a density factor to convert volume measurements to weight measurements, said system comprising a transformer energized by a source of alternating voltage and having a secondary which is center-tapped to form two arms of a bridge circuit, a measuring condenser immersed in the liquid in said container to an extent dependent upon the level thereof, the reactance of said measuring condenser being a function of the level and of the dielectric constant of said liquid, a first inductance connected to said measuring condenser and having a reactance at the frequency of said alternating voltage equal to the magnitude of the reactance of said measuring condenser when free of said liquid, said measuring condenser and said first inductance connected thereto comprising a first network which is connected as a third arm of said bridge circuit, and said measuring condenser and said first inductance being connected in said third arm so as to pass A. C. current through said third arm through both said measuring condenser and said first inductance; a combined hydrometric and capacitive device constituting a compensating condenser and including at least one condenser plate which is immersed in the liquid to an extent dependent upon the density thereof, so as to have a reactance which is a function both of the specific gravity and of the dielectric constant of said liquid and is independent of the level thereof in said container, a second inductance connected to said compensating condenser and having a reactance at the frequency of said alternating voltage equal to the magnitude of the reactance of said compensating condenser when free of said liquid and if the dielectric between its plates had a constant of unity, said compensating condenser and said second inductance connected thereto comprising a second network which is connected as a fourth arm of said bridge circuit, and said compensating condenser and said second inductance being connected in said second arm in the same way as said measuring condenser and said first inductance are connected in said first arm and so as to pass A. C. current through said second arm through both said compensating condenser and said second inductance; the junction between said first and second networks and the center tap of said secondary of said transformer being the output terminals of said bridge, and voltage-responsive means connected to said output terminals for indicating a quantity which is a function of the weight of said liquid.

10. A system according to claim 9, comprising in addition, means for balancing said bridge circuit for null method indication, including voltage-dividing means having a resistance connected in parallel with at least a part of the secondary of said transformer, and a variable tap on said resistance connected to one of said third and fourth arms of said bridge circuit at a point remote from the interconnection between said third and fourth arms, the position of said tap when the bridge is in balance being indicative of the weight of the liquid in the container.

11. A system according to claim 9, including means for balancing the bridge circuit for null method indication, comprising voltage dividing means having a resistance connected in parallel with at least a part of the secondary of said transformer, a variable tap on said resistance connected to one of said third and fourth arms of said bridge circuit at a point remote from the interconnection between said third and fourth arms, a reversible electric motor controlled by the output of said bridge circuit as to its direction and degree of rotation, mechanical means connecting said motor to said variable tap and for connecting said motor to an indicating device, so that the operation of said motor in response to bridge unbalance will serve to rebalance said bridge and to move said indicating device to indicate the position of said tap when said bridge is balanced, said indicating device serving to indicate the weight of the liquid in said container.

12. In a measuring system, a capacitive element responsive to the dielectric constant and density of the liquid being measured, comprising a first condenser plate stationarily disposed and extending into, above and below said liquid, a float positioned for free vertical movement in said liquid adjacent to said first condenser plate, and a second condenser plate carried by said float and arranged to assume a partially immersed position relative to the surface of said liquid in accordance with the density of said liquid and under the control of said float.

13. In a measuring system, a condenser having a capacity which is a function of the dielectric constant and density of a liquid being measured, said condenser including a first stationary condenser plate extending vertically through the surface of said liquid, and a float positioned for free vertical movement in said liquid adjacent to and a predetermined distance from said first plate and having an outer conductive surface which is immersed in the liquid to an extent dependent upon the density of said liquid and which forms the second plate of said condenser.

14. In a measuring system, a condenser having a capacity which is a function of the dielectric constant and density of a liquid being measured, said condenser including a first metal cylinder surrounding a body of said liquid, a cylindrical float having metal sides and positioned for free vertical movement in said liquid within said first metal cylinder, and guide means for maintaining a predetermined horizontal distance between said first metal cylinder and said float, whereby the capacity between said first metal cylinder and the metal sides of said float is a function of the density and dielectric constant of said liquid.

15. A measuring system in accordance with claim 6, in which said compensating condenser comprises a first stationary condenser plate extending into the liquid being measured, a float positioned for free vertical movement in and with respect to said liquid adjacent to said first plate, and a second condenser plate carried by said float and maintained spaced from said first plate, said second plate being immersed in said liquid to an extent dependent upon the density of said liquid.

16. In a capacitance-type gauge for measuring the amount of liquid in a container, apparatus for rendering the determinations independent of the dielectric constant of the liquid comprising a source of alternating current, a first network including a measuring condenser having spaced plates communicating with said liquid, the capacitance of said measuring condenser being a function of the level and dielectric constant of said liquid, and a first inductive element connected in parallel with said measuring condenser and having a reactance value at the frequency of said alternating current equal to the magnitude of the reactance of said measuring condenser when free of said liquid, a second network including a compensating condenser including a first stationary condenser plate extending into the liquid, a float positioned for free vertical movement in said liquid, and a second plate carried by said float, spaced from said first plate and arranged to assume a position partially immersed in said liquid to an extent dependent upon the density of said liquid and under the control of said float, the capacitance of said compensating condenser being a function of the density and dielectric constant of said liquid, and a second inductive element connected in parallel with said compensating condenser and having a reactance value at the frequency of said alternating current equal to the magnitude of the reactance which said compensating condenser would have if the dielectric constant of said liquid were unity, circuit means coupling said source to said first and second networks, and comparison means responsive to the relative impedances of said first and second networks as a measure of the amount of said liquid.

References Cited in the file of this patent

UNITED STATES PATENTS

| | | |
|---|---|---|
| 2,082,539 | Fischer | June 1, 1937 |
| 2,147,500 | Rothenberger | Feb. 14, 1939 |
| 2,273,850 | Ewald | Feb. 24, 1942 |
| 2,416,808 | Weiss | Mar. 4, 1947 |
| 2,563,281 | Griffith | Aug. 7, 1951 |
| 2,581,085 | Edelman | Jan. 1, 1952 |